United States Patent
Imai et al.

(10) Patent No.: US 6,360,198 B1
(45) Date of Patent: Mar. 19, 2002

(54) AUDIO PROCESSING METHOD, AUDIO PROCESSING APPARATUS, AND RECORDING REPRODUCTION APPARATUS CAPABLE OF OUTPUTTING VOICE HAVING REGULAR PITCH REGARDLESS OF REPRODUCTION SPEED

(75) Inventors: Atsushi Imai; Nobumasa Seiyama; Tohru Takagi, all of Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/297,730

(22) PCT Filed: Sep. 1, 1998

(86) PCT No.: PCT/JP98/03889

§ 371 Date: May 6, 1999

§ 102(e) Date: May 6, 1999

(87) PCT Pub. No.: WO99/14751

PCT Pub. Date: Mar. 25, 1999

(30) Foreign Application Priority Data

Sep. 12, 1997 (JP) ............................................. 9-249220

(51) Int. Cl.[7] ............................................... G01L 21/04
(52) U.S. Cl. ......................... 704/207; 704/265; 704/500
(58) Field of Search ................................ 704/207, 205, 704/210, 216, 500, 501, 503, 504, 258, 265, 266, 268, 206, 217, 218

(56) References Cited

U.S. PATENT DOCUMENTS

| | | | | |
|---|---|---|---|---|
| 4,586,191 A | * | 4/1986 | Nishimura | 704/207 |
| 4,734,495 A | | 3/1988 | Fukami et al. | 360/8 |
| 4,734,795 A | * | 3/1988 | Fukami et al. | 360/8 |
| 4,864,620 A | * | 9/1989 | Bialick | 704/207 |
| 5,806,023 A | * | 9/1998 | Satyamurty | 704/211 |
| 5,828,994 A | * | 10/1998 | Covell et al. | 704/211 |
| 5,828,995 A | * | 10/1998 | Satyamurti et al. | 704/211 |
| 5,842,172 A | * | 11/1998 | Wilson | 704/506 |

FOREIGN PATENT DOCUMENTS

| | | | | |
|---|---|---|---|---|
| EP | 0 702 354 A1 | * | 3/1996 | G10L/5/06 |
| JP | 07303240 | | 11/1995 | |
| JP | 08096514 | | 4/1996 | |

\* cited by examiner

*Primary Examiner*—Richemond Dorvil
(74) *Attorney, Agent, or Firm*—Olson & Hierl, Ltd.

(57) ABSTRACT

A reproduction part reproduced at a changeable speed ratio r. An A/D conversion part A/D converts, based on sampling frequency $f_i$, an audio signal reproduced at a speed different from that upon recording. A block data division part divides audio data based on an attribute possessed by the audio data. An audio data connection part successively interpolates or thins out the divided audio data based on a ratio of 1/r. A D/A conversion part D/A converts the interpolated or thinned-out audio data based on sampling frequency $f_o$. If a relation of $f_i/f_o = r/c$ is satisfied, the audio signal is outputted as a sound of high quality constantly synchronized with an image signal and having a pitch which does not change irrespective of the changeable speed ratio r at which the image signal is reproduced.

9 Claims, 5 Drawing Sheets

AUDIO PROCESSING METHOD, AUDIO PROCESSING APPARATUS, AND RECORDING REPRODUCTION APPARATUS CAPABLE OF OUTPUTTING VOICE HAVING REGULAR PITCH REGARDLESS OF REPRODUCTION SPEED

TECHNICAL FIELD

The present invention relates to an audio processing method, audio processing apparatus, and recording and reproduction apparatus, which, in an apparatus such as a VTR apparatus for business use, 6-mm tape recorder apparatus, or the like, arranged to output a sound whose pitch has changed in proportion to the reproduction speed, enables a sound, whose pitch is normal regardless of the reproduction speed, to be output when reproducing the recorded sound at this given reproduction speed. Particularly, the invention concerns an audio processing method, audio processing apparatus, and recording and reproduction apparatus, which, when applied to a VTR apparatus, enables the production of a high quality of sound that matches with a wanted reproduction speed and that is synchronized with the image.

BACKGROUND ART

In general, in a case where reproducing at a given speed a sound that has been recorded in an analog recording medium such as a magnetic tape, the pitch of the sound is also changed in proportion to this reproduction speed.

Also, regarding a VTR apparatus for business use, recording of both an image and a sound has in recent years been performed predominantly by the use of a digital system. However, regarding the output of a sound, for the sake of increasing the efficiency of the editing operation, a sound whose pitch has changed is output in proportion to the reproduction speed as in the case of a VTR apparatus of analog system.

Meanwhile, regarding a VTR apparatus, although an image has hitherto been changeable speed reproduced, there has hitherto existed no VTR apparatus that has the function of, while synchronizing a sound with the changeable speed reproduced image, correcting the pitch of the sound to a normal level.

Also, if imposing a limitation on means for correcting the pitch of the sound, there is known a pitch shifter (pitch changer) which has been presently being used in a "karaoke" apparatus or the like. However, if using such a pitch shifter in the correction of the pitch in the above-described VTR apparatus, when the object sound is a human voice or the correction range therefor is wide, such as, for example, when restoring to the original pitch the sound whose pitch has been lowered 1 octave as in the case of a ½ time speed reproduction, there existed the problem with the quality of the sound, such as the problem that a large amount of distortion or echo feeling follows the corrected sound.

As will be understood from the above-described problems, when correcting a change in the sound pitch, if considering the quality of broadcasting, there has hitherto existed no suitable apparatus. Namely, when performing slow reproduction of a VTR apparatus that is used in, for example, broadcasting, there was the problem that it was impossible to use the sound that had been reproduced simultaneously with the reproduction of the image excepting a case where use was made of a non-realistic sound whose pitch had been intentionally changed.

The present invention has been made in view of the above-described problems and has an object to provide an audio processing method, audio processing apparatus and recording and reproduction apparatus which take in a sound which has been changeable speed reproduced within a practical use range of changeable speed as when having reproduced at a speed that is ½ time, or 2 times, higher and whose pitch has changed, and which, while the clearness of the sound is being maintained as is, enables the pitch of the sound to be restored to its original level within a range of ±1 octave or so in a state where the sound is synchronized highly accurately with the image.

DISCLOSURE OF INVENTION

To achieve the above object, according to an audio processing method as described in claim 1, the gist is that, in an audio processing method of, when reproducing, at a reproduction speed different from that at which an audio signal has been recorded in a recording medium, the audio signal on the recording medium, adjusting the pitch of the reproduced audio signal, wherein a sampling frequency $f_i$, which is used when performing A/D conversion of the audio signal that has been reproduced from the recording medium at a changeable speed ratio r with respect to a normal reproduction speed to thereby produce audio data, and a sampling frequency $f_o$, which is used when performing, after having performed digital signal processing on the audio data, D/A conversion thereof to thereby produce an audio signal, are respectively set so that these frequencies and the changeable speed ratio r may satisfy prescribed conditions.

According to an audio processing method as described in claim 2, the gist is that, in the audio processing method as described in claim 1, when performing digital signal processing on the audio data that has been obtained by performing A/D conversion, at the sampling frequency $f_i$, of the audio signal that has been reproduced from the recording medium at the changeable speed ratio r, the digital signal processing comprising the steps of: performing a series of processes of performing analysis processing on the attribute of the audio data, dividing as the next step the audio data into blocks each having a prescribed time width according to data that has been obtained through the performance of the analysis processing and if necessary performing interpolation or thinning of the audio data in units of a block to thereby make a time length of the audio data if necessary 1/r time greater and thereby produce output audio data, and thereafter performing D/A conversion of the output audio data at the sampling frequency $f_o$, to thereby produce an audio signal.

According to the audio processing method as described in claim 3, the gist is that, in the audio processing method as described in claim 1, as the prescribed conditions, when the sampling frequencies $f_i$ and $f_o$ and the changeable speed radio r satisfy the relationship of $f_i/f_o = r$, there is used the sampling frequency $f_i$ which is represented by an expression $f_i = r \cdot f_o$; and when the sampling frequencies $f_i$ and $f_o$ and the changeable speed ratio r are in the relationship of $f_i/f_o \neq r$, there is used the sampling frequency $f_i$ that is represented by an expression $f_i = r \cdot f_o / c$ that includes a sampling frequency conversion coefficient c.

According to the audio processing method as described in claim 4, the gist is that, in the audio processing method as described in claim 2, as the prescribed conditions, when the sampling frequencies $f_i$ and $f_o$ and the changeable speed radio r satisfy the relationship of $f_i/f_o = r$, there is used the sampling frequency $f_i$ which is represented by an expression $f_i = r \cdot f_o$; and when the sampling frequencies $f_i$ and $f_o$ and the changeable speed ratio r are in the relationship of $f_i/f_o \neq r$, there is used the sampling frequency $f_i$ that is represented by an expression $f_i = r \cdot f_o/c$ that includes a sampling frequency conversion coefficient c.

According to the audio processing method as described in claim 5, the gist is that, in the audio processing method as described in claim 4, when performing digital signal processing on the audio data that has been obtained by performing A/D conversion, at the sampling frequency $f_i$, of the audio signal that has been reproduced from the recording medium at the changeable speed ratio r, the digital signal processing comprising the steps of: monitoring time data of the audio signal read out from the recording medium and time data of the output audio data that has been obtained through the performance of the series of processes to thereby correct time non-coincidence that occurs between the audio signal and the output audio data.

According to the audio processing apparatus as described in claim 6, the gist is that, in an audio processing apparatus for, when reproducing, at a reproduction speed different from that at which an audio signal has been recorded in a recording medium, the audio signal on the recording medium, adjusting the pitch of the reproduced audio signal, the audio processing apparatus comprising: A/D conversion means (3) for performing A/D conversion, at a sampling frequency $f_i$, of the audio signal that has been reproduced from the recording medium; analysis processing means (5) for performing analysis processing on audio data that has been obtained by the A/D conversion according to the attribute thereof; block data division means (6) for dividing the audio data into block units each having a prescribed time width according to data that has been obtained by the analysis processing; output audio data production means (11) for performing a series of processings of performing interpolation or thinning processing on the audio data in divided block units if necessary to thereby make data length thereof 1/r greater and thereby produce output audio data; audio output means (12) for performing D/A conversion, at a sampling frequency $f_o$, of the thus-produced output audio data to thereby output a sound synchronized with an image; and sampling frequency setting means for setting the respective sampling frequencies $f_i$ and $f_o$ so that the sampling frequency $f_i$ used when performing A/D conversion, the sampling frequency $f_o$ used when performing D/A conversion of the audio data to thereby produce an audio signal, and the changeable speed radio r may satisfy prescribed conditions.

According to the audio processing method as described in claim 7, the gist is that, in the audio processing apparatus as described in claim 6, as the prescribed conditions that are set by the sampling frequency setting means, when the sampling frequencies $f_i$ and $f_o$ and the changeable speed radio r satisfy the relationship of $f_i/f_o = r$, there is used the sampling frequency $f_i$ which is represented by an expression $f_i = r \cdot f_o$; and when the sampling frequencies $f_i$ and $f_o$ and the changeable speed ratio r are in the relationship of $f_i/f_o \neq r$, there is used the sampling frequency $f_i$ that is represented by an expression $f_i = r \cdot f_o/c$ that includes a sampling frequency conversion coefficient c.

According to the audio processing apparatus as described in claim 8, the gist is that, in the audio processing apparatus as described in claim 7, the output audio data production means (11) comprises means for monitoring time data of the audio signal read out from the recording medium and time data of the output audio data that has been obtained through the performance of the series of processes to thereby correct time non-coincidence that occurs between the audio signal and the output audio data.

According to the recording and reproduction apparatus as described in claim 9, the gist is that this apparatus includes the audio processing apparatus according to claim 6.

According to the recording and reproduction apparatus as described in claim 10, the gist is that this apparatus includes the audio processing apparatus according to claim 7.

According to the recording and reproduction apparatus as described in claim 11, the gist is that this apparatus includes the audio processing apparatus according to claim 8.

As has been described above, according to the present invention, in an audio processing method of, when reproducing, at a reproduction speed different from that at which an audio signal has been recorded in a recording medium, the audio signal recorded in the recording medium, adjusting the pitch of the reproduced audio signal, a sampling frequency $f_1$, which is used when performing A/D conversion of the audio signal that has been reproduced from the recording medium at a changeable reproduction speed ratio r with respect to a normal reproduction speed to thereby produce audio data, and a sampling frequency $f_o$, which is used when performing, after having performed digital signal processing on the audio data, D/A conversion thereof to thereby produce an audio signal, are respectively set so that these frequencies and the changeable reproduction speed r may satisfy prescribed conditions. As a result of this, the invention takes in a sound which has been changeable speed reproduced and whose pitch has changed within a practical use range of changeable speed as when having reproduced at a speed that is ½ time, or 2 times, higher, and, while the clearness of the sound is being maintained as is, enables the pitch of the sound to be restored to its original level within a range of ±1 octave or so in a state where the sound is synchronized highly accurately with the image.

Also, the circuit of the invention can be constructed by adding merely a small number of circuits to the circuits that are conventionally employed.

BEST MODE FOR CARRYING OUT THE INVENTION

Figure 1:
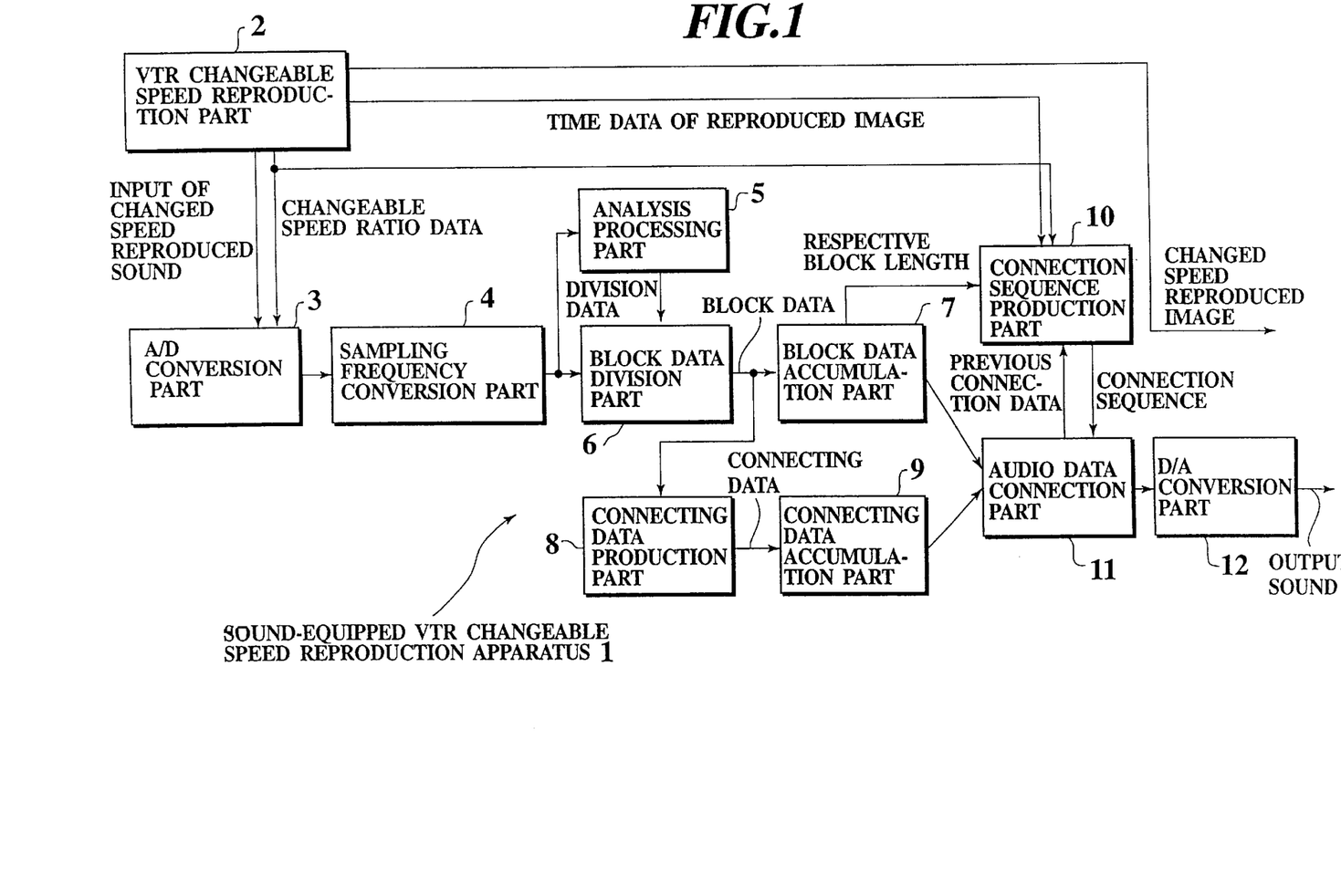
FIG. 1 is a block diagram illustrating the outline of a sound-equipped VTR changeable speed reproduction apparatus that uses an audio processing method, audio processing apparatus and recording and reproduction apparatus according to the present invention.

FIG. 1 is a block diagram illustrating the outline of a sound-equipped VTR changeable speed reproduction apparatus in which there are used an audio processing method, audio processing system and recording/reproduction apparatus according to the present invention.

The sound-equipped VTR changeable speed reproduction apparatus 1 illustrated in this figure comprises a VTR changeable speed reproduction part 2, an A/D conversion part 3, a sampling frequency conversion part 4, an analysis processing part 5, a block data division part 6, a block data accumulation part 7, a connecting data production part 8, a connecting data accumulation part 9, a connection sequence production part 10, an audio data connection part 11, and a D/A conversion part 12. In this reproduction apparatus 1, when having reproduced an audio signal at a speed different from that at the time of recording through the control of the VTR changeable speed reproduction part 2, by, while matching a sampling frequency $f_i$ (Hz) used when performing A/D conversion with a sampling frequency $f_o$ (Hz) used when performing D/A conversion by the use of the sampling frequency conversion part 4, dividing the audio data into blocks each having a prescribed time width and if necessary performing interpolation or thinning thereof according to a changeable speed ratio r of the VTR changeable speed reproduction part 2 and the attribute of a sound, a high. quality of sound with no change being made in the pitch thereof is output while synchronizing the presented timing of the sound with a video signal that has been changeable-speed reproduced in the VTR changeable speed reproduction part 2.

At this time, in a series of processes of performing A/D conversion of the audio signal reproduced at a speed different from that at the time of recording, performing correction of the pitch and extension and contraction of the time length of the data by digital signal processing, and thereafter performing D/A conversion and thereby outputting a sound synchronized with an image, assuming that the sampling frequency at the time of A/D conversion is represented by $f_i$ (Hz); the sampling frequency at the time of D/A conversion is represented by $f_o$ (Hz); and the changeable speed ratio of the VTR changeable speed reproduction part 2 is represented by r, A/D conversion of the audio signal is performed using the sampling frequency $f_i$ which is expressed by $f_i = r \cdot f_o$ (Hz) in a case where the sampling frequencies $f_i$ and $f_o$ (Hz) can be set so as to satisfy the relationship of $f_i/f_o = r$. Also, in a case where the relationship of $f_i/f_o \neq r$ is established because the sampling frequencies $f_i$ and $f_o$ cannot be set to be at given values, the audio signal is converted to audio data that is in a state where sampling has been performed using a sampling frequency conversion coefficient $c = r \cdot f_o/f_i$ (Hz) by the sampling frequency conversion part 4 provided in a stage succeeding the A/D conversion part 3. And, by performing a series of processes of performing analysis processing on the audio signal according to the attribute of the sound, dividing the audio data into blocks each having a prescribed time width according to data that has been obtained through the performance of the analysis processing and if necessary performing interpolation or thinning of the data in units of a block to thereby make the time length of the data if necessary 1/r time greater, and, after the performance of such series of processes, performing D/A conversion of the audio signal at the sampling frequency $f_o$ (Hz), a high quality of sound with no change being made in the pitch thereof is output while synchronizing the presented timing of the sound with the video signal that has been obtained with a changeable speed reproduction of the VTR changeable speed reproduction part 2.

The VTR changeable speed reproduction part 2 is constructed of a VTR apparatus which makes it possible to take out the audio signal recorded therein in match with a given video reproduction speed and, when reproduction has been performed at a changeable reproduction speed, to electrically output the changeable speed ratio r with respect to a normal reproduction speed, a conventional VTR apparatus having the function of making visual display of the changeable speed ratio r, or the like. The VTR changeable speed reproduction part 2 supplies, while reproducing the video signal and audio signal recorded at an ordinary recording speed with a reproduction speed as designated and outputting the video signal (changed speed reproduced video signal) that has been thereby obtained to a monitor device or the like, the audio signal reproduced together with this video signal (changed speed reproduced audio signal) and changeable speed ratio data (the data including the changeable speed radio r) to the A/D conversion part 3 and also supplies time data on the changed speed reproduced video signal and the changeable speed ratio data to the connection sequence production part 10. It is to be noted that in a case where only an audio processing function alone is demanded of this sound-equipped VTR changeable speed reproduction apparatus 1, there may be used as the VTR changeable speed reproduction part 2 an apparatus other than a VTR apparatus, such as a media recording and reproduction apparatus for use on sound only which is represented by, for example, a 6-mm tape audio reproduction apparatus.

The A/D conversion part 3 performs A/D conversion of the audio signal (the changed speed reproduced audio signal) that has been output from the VTR changeable speed reproduction part 2 at the sampling frequency $f_i$ that corresponds to the changeable speed ratio data (the changeable speed ratio r with respect to a normal reproduction speed) that has been output from the VTR changeable speed reproduction part 2, and supplies the audio data that has been thereby obtained to the sampling frequency conversion part 4.

At this time, when the sampling frequencies $f_i$ and $f_o$ can be set so that the sampling frequency $f_i$ at the time of A/D conversion, the sampling frequency $f_o$ at the time of D/A conversion and the changeable speed ratio r satisfy the relationship of $f_i/f_o = r$, the A/D conversion part 3 performs A/D conversion of the audio signal (the changed speed reproduced audio signal) output from the VTR changeable speed reproduction part 2 at the sampling frequency $f_i = r \cdot f_o$ (Hz) to thereby produce audio data. Also, when the sampling frequency $f_i$ at the time of A/D conversion, the sampling frequency $f_o$ at the time of D/A conversion and the changeable speed ratio r are in the relationship of $f_i/f_o \neq r$ as in the case where the sampling frequencies $f_i$ and $f_o$ are each a fixed value for example, the A/D conversion part 3 performs A/D conversion of the audio signal (the changed speed reproduced audio signal) output from the VTR changeable speed reproduction part 2 at a prescribed sampling frequency $f_i$ (Hz) to thereby produce audio data, and supplies the audio data that has been thereby obtained to the sampling frequency conversion part 4.

The sampling frequency conversion part 4 produces $c = 1$ as the sampling frequency conversion coefficient c when the audio data output from the A/D conversion part is audio data that has been so converted so as to satisfy the relationship of $f_i/f_o = r$. Also, the sampling frequency conversion part 4 produces $c = r \cdot f_o/f_i$ as the sampling frequency conversion coefficient c when the audio data output from the A/D conversion part 3 is audio data that has been so converted with the relationship $f_i/f_o \neq r$. The sampling frequency conversion part 4 converts the sampling frequency of the audio data output from the A/D conversion part 3 according to the sampling frequency conversion coefficient c and thereby converts the audio data that has been A/D converted at the sampling frequency $f_i$ to audio data corresponding to the audio data that was so A/D converted at the sampling frequency $f_o$ (Hz) the same as that used when reproduction was made at a normal reproduction speed and supplies this converted audio data to the analysis processing part 5 and to the block data division part 6.

The analysis processing part 5 sequentially performs input processing of taking in the audio data (the audio data corresponding to that which has been so A/D converted at the sampling frequency $f_o$ (Hz)) output from the sampling frequency conversion part 4, decimation processing of decreasing the sampling rate of the audio data that has been obtained by the input processing (down to 4 kHz in the case of this embodiment) and reducing the amount of the audio data to be thereafter processed, attribute analysis processing of analyzing the audio data output from the A/D conversion part 3 and the audio data that has been obtained by the decimation processing and thereby classifying the resulting data into a voiced sound, unvoiced sound and silent, and block-length determination processing of performing auto-correlation analysis for each of the voiced sound, unvoiced sound and silent that have been obtained by the attribute analysis processing and thereby detecting the periodicity thereof and thereby determining the block length necessary for dividing the audio data according to the detected results, and supplies division data (data representing the block length for each of the voiced sound, unvoiced sound and silent) that has been thereby obtained to the block data division part 6.

In this case, in the attribute analysis processing, regarding the audio data output from the sampling frequency conversion part 4, calculation is made of the sum of the square of the data by the use of a window width of around 30 ms or so and calculation is also made of the power value P of the audio data at intervals each of around 5 ms or so. In addition, comparison is made between the power value P and a preset threshold value $P_{min}$, whereby the data portion that satisfies the relationship of "$P<P_{min}$" is determined to be an unvoiced sound section while, on the other hand, the data portion that satisfies the relationship of "$P_{min} \leq P$" is determined to be a voiced sound section. Thereafter, zero cross analysis, auto-correlation analysis with respect to the audio data that was obtained by the decimation processing, etc. are performed on the audio data output from the sampling frequency conversion part 4. And, according to the analysis results and the power value P, it is determined whether of the audio data the portion satisfying the relationship of "$P_{min} \leq P$" is a sound section resulting from the vibration of the vocal cord (the voiced sound section) or a sound section non-resulting from the vibration of the vocal cord (the unvoiced sound section). It is to be noted that although the attributes such as noises or music-or-the like background sounds are also considered as being among the respective attributes of the audio data output from the sampling frequency conversion part 4, since in general it is difficult to make exact auto discrimination between noises signals or background sound signals and audio signals, noise sounds or background sounds are also classified into either the voiced sound or the unvoiced sound.

Also, in the block length determination processing, regarding the data which has been determined as falling within the voiced sound section by the attribute analysis processing, over a wide range of from approximately 1.25 ms to approximately 28.0 ms in which the pitch periods of the voiced sound are distributed, auto-correlation analysis is performed using a plurality of window widths having different values. Detection is thereby performed of the pitch periods (the basic periods which are the vibration periods of the vocal cord) which are as accurate as possible. According to the detection results, determination is made of the block length so that each of the detected pitch periods may become the block length of a corresponding data item. Also, regarding each of the data types that have been determined, respectively, as falling within the unvoiced sound section and the silent section by the attribute analysis processing, detection is made of the periodicity within the time length of 10 ms. According to the thus-obtained detection results, determination is made of the block length. And, the block lengths that fall within each of the voiced sound section, unvoiced sound section and silent section are supplied to the block data division part 6 as dividing data.

The block data division part 6 divides the audio data output from the sampling frequency conversion part 4 according to the block length in the voiced sound section and the block length in the unvoiced sound section, the both block lengths of which are so indicated by the dividing data output from the analysis processing part 5, and supplies the audio data in block units that has been obtained by this division processing and the block length of this audio data to the block data accumulation part 7 and to the connecting data production part 8.

The block data accumulation part 7 is equipped with a ring buffer. The block data accumulation part 7 takes in the audio data (the audio data in block units) output from the block data division part 6 and the block length of this audio data. While temporarily storing them into the ring buffer, the part 7 reads out appropriately the respective block lengths that are being temporarily stored therein and supplies the thus-read-out data to the connection sequence production part 10. Further, the part 7 reads out appropriately the audio data in block units that is being temporarily stored therein and supplies the thus-read-out data to the audio data connection part 11.

Figure 2:
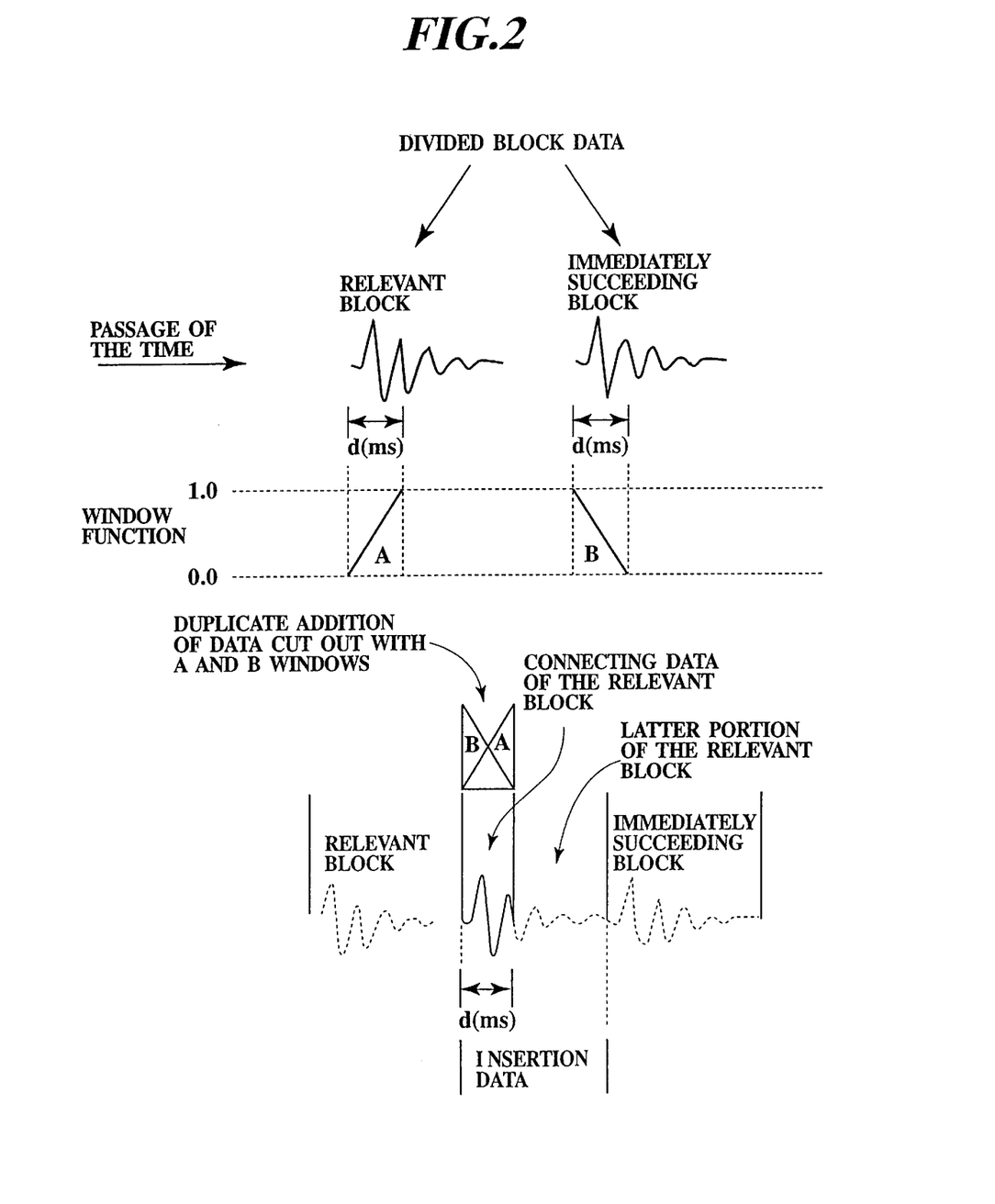
FIG. 2 is a typical view illustrating an example of the connecting data production operation of a connecting data production part illustrated in FIG. 1.

Also, while taking in the audio data in block units that is output from the block data division part 6, as illustrated in FIG. 2, the connecting data production part 8 cuts out, by using linearly increasing window A and decreasing window B, a start portion of the audio data contained in the relevant block and a start portion of the audio data corresponding to the block that is the first or second block after the location of this relevant block, and thereafter performs duplicate addition of these start portions to thereby produce connecting data, and supplies it to the connecting data accumulation part 9.

In this case, if the reproduction speed of the sound-equipped VTR changeable speed reproduction apparatus 1 is set to be "slowly", the connecting data production part 8 takes in the audio data in block units that is output from the block data division part 6. And, the part 8 performs, in units of a block, windowing with respect to the audio data situated at the start portion of this block by the use of the window A linearly increasing during a time length d (ms) and performs, in units of a block, windowing with respect to the audio data situated at the start portion of a block immediately succeeding this block by the use of the window B linearly decreasing during a time length d (ms). Thereafter, the part 8 performs duplicate addition of the start portion of the immediately succeeding block and the start portion of the block preceding the same, thereby producing connecting data having a time length of d (ms), and supplies it to the connecting data accumulation part 9. Also, if the reproduction speed of the sound-equipped VTR changeable speed reproduction apparatus is set to be "quickly", the connecting data production part 8 takes in the audio data in block units that is output from the block data division part 6. And, the part 8 performs, in units of a block, windowing with respect to the audio data situated at the start portion of this block by the use of the window A linearly increasing during the time length d (ms) and performs, in units of a block, windowing with respect to the audio data situated at the start portion of a block that is the second block after this block by the use of the window B linearly decreasing during the time length d (ms). Thereafter, the part 8 performs duplicate addition of the start portion of the immediately succeeding block and the start portion of the block preceding the same, thereby producing connecting data having a time length of d (ms), and supplies it to the connecting data accumulation part 9. At this time, although a given value falling within the range of from "5 (ms)" to "the shortest block of the relevant block, the block that is the first block after it, and the block that is the second block after it" can be selected as the time length d, the shorter the time length d is made, the smaller can be made the capacity of the buffer of the connecting data accumulation part 9.

The connecting data accumulation part 9 is equipped with a ring buffer. The part 9 takes in the connecting data that is output from the connecting data production part 8, and, while temporarily storing it into the ring buffer, reads out appropriately the respective connecting data items temporarily stored therein and supplies it to the audio data connection part 11.

Also, the connection sequence production part 10 performs, according to the changeable speed ratio data and time data of changed speed reproduced image that have been output from the VTR changeable speed reproduction part 2, calculation of the extension/contraction scale factor in terms of time that is necessary for causing the coincidence of the output timing of the changed speed reproduced image with the output timing of the sound, and stores the thus-calculated extension/contraction scale factor temporarily into a rewritable memory equipped within itself. Also, the connection sequence production part 10 is equipped with a connection sequence determination portion, the connection sequence determination portion reading out the time-length extension/contraction scale factor stored in the rewritable memory at preset prescribed time intervals each of, for example, from approximately 50 to approximately 100 ms or so while, on the other hand, the connection sequence determination portion momentarily produces, according to this extension/contraction scale factor, the respective block lengths output from the block data accumulation part 7, and the previous connection data output from the audio data connection part 11, the connection sequence of the respective audio data items in block units and the respective connecting data items in block units, i.e., the connection sequence necessary for causing the coincidence of the output timing of the changed speed reproduced image designated by the changeable speed data output from the VTR changeable speed reproduction part 2 with the output timing of the sound.

In this case, as a method of, in the connection sequence determination part of the connection sequence production part 10, causing the coincidence of the output timing of the changed speed reproduced image with the output timing of the sound, there is used the following method. Namely, the method is to calculate the inverse multiple 1/r of the changeable speed ratio r that is indicated by the changeable speed ratio data that has been output from the VTR changeable speed reproduction part 2 to thereby set this inverse multiple 1/r as the dividing data (the extension/contraction scale factor of the divided block) that has been obtained in the analysis processing part 5, to perform the time-length extension/contraction operations according to this extension/contraction scale factor, and, in order to highly precisely synchronize the sound with the changed speed reproduced image output from the VTR changeable speed reproduction part 2, to monitor the previous connecting data output from the audio data connection part 11 and the time data (the time data such as data length or CTL) of the changed speed reproduced image output from the VTR changeable speed reproduction part 2 to thereby appropriately correct the extension/contraction scale factor so as for the non-coincidence therebetween not to be cumulatively calculated.

Figure 3:
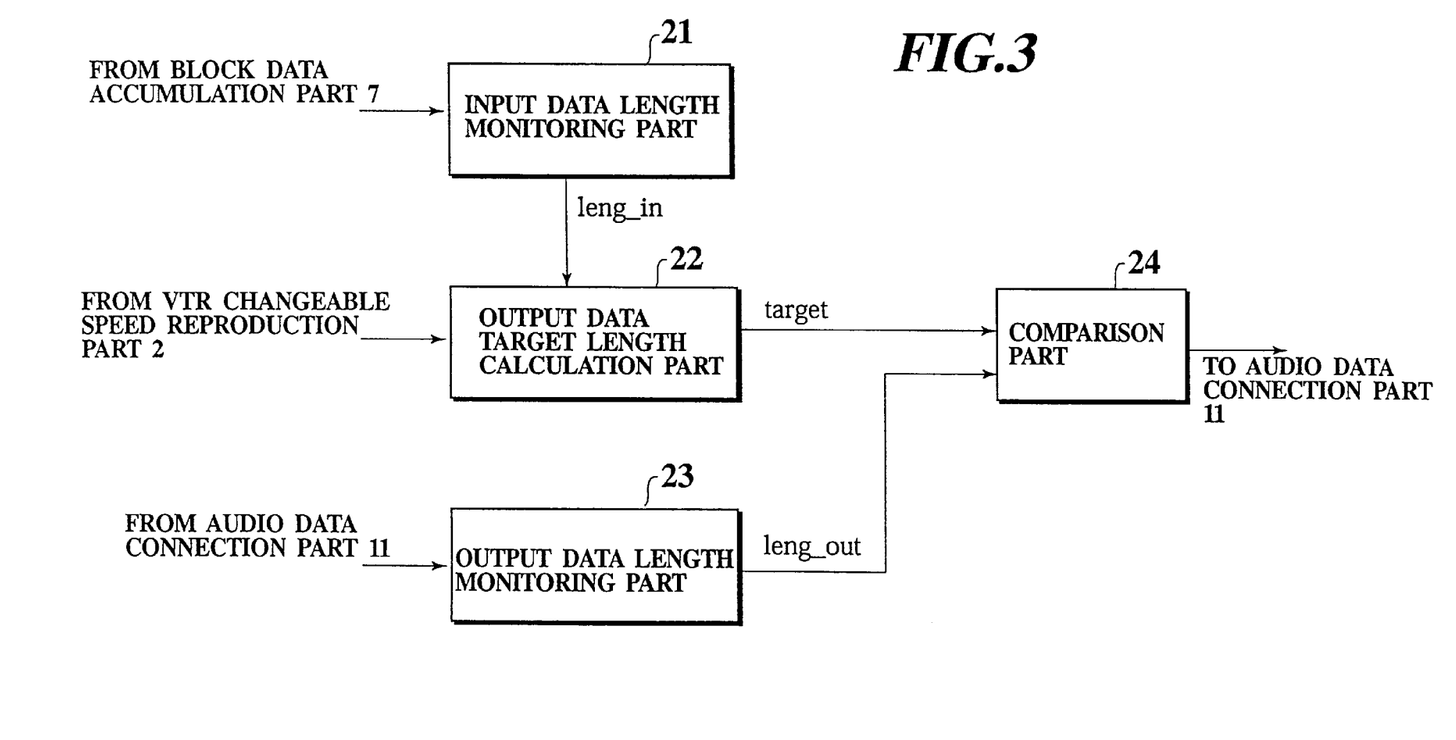
FIG. 3 is a block diagram illustrating a detailed circuit construction example of a time data monitoring operation portion that is located within a connection sequence production part illustrated in FIG. 1.

Also, the method of performing the time data monitoring in the connection sequence determination portion of the connection sequence production part 10 is considered to be executed with such a construction as illustrated in FIG. 3. Namely, the block length in block units that is output from the block data accumulation part 7 is calculated at all times by an input data length monitoring portion 21 to thereby determine the input data length leng__in. Then, while determining this input data length, the extension/contraction scale factor (inverse multiple) 1/r is calculated by an output data target length calculation portion 22 according to the input data length leng__in and the changeable speed ratio r output from the VTR changeable speed reproduction part 2 to thereby determine the output data target length "target" (target=leng__in/r). Also, in parallel with this, by an output data length monitoring portion 23, an output data length leng__out is determined according to the previous connection data output from the audio data connection part 11. Thereafter, determination is made of the difference t (t=target−leng__out) between the output data target length "target" and the output data length leng__out by a comparison portion 24, hereupon this difference is supplied to the audio data connection part 11.

Figure 4:
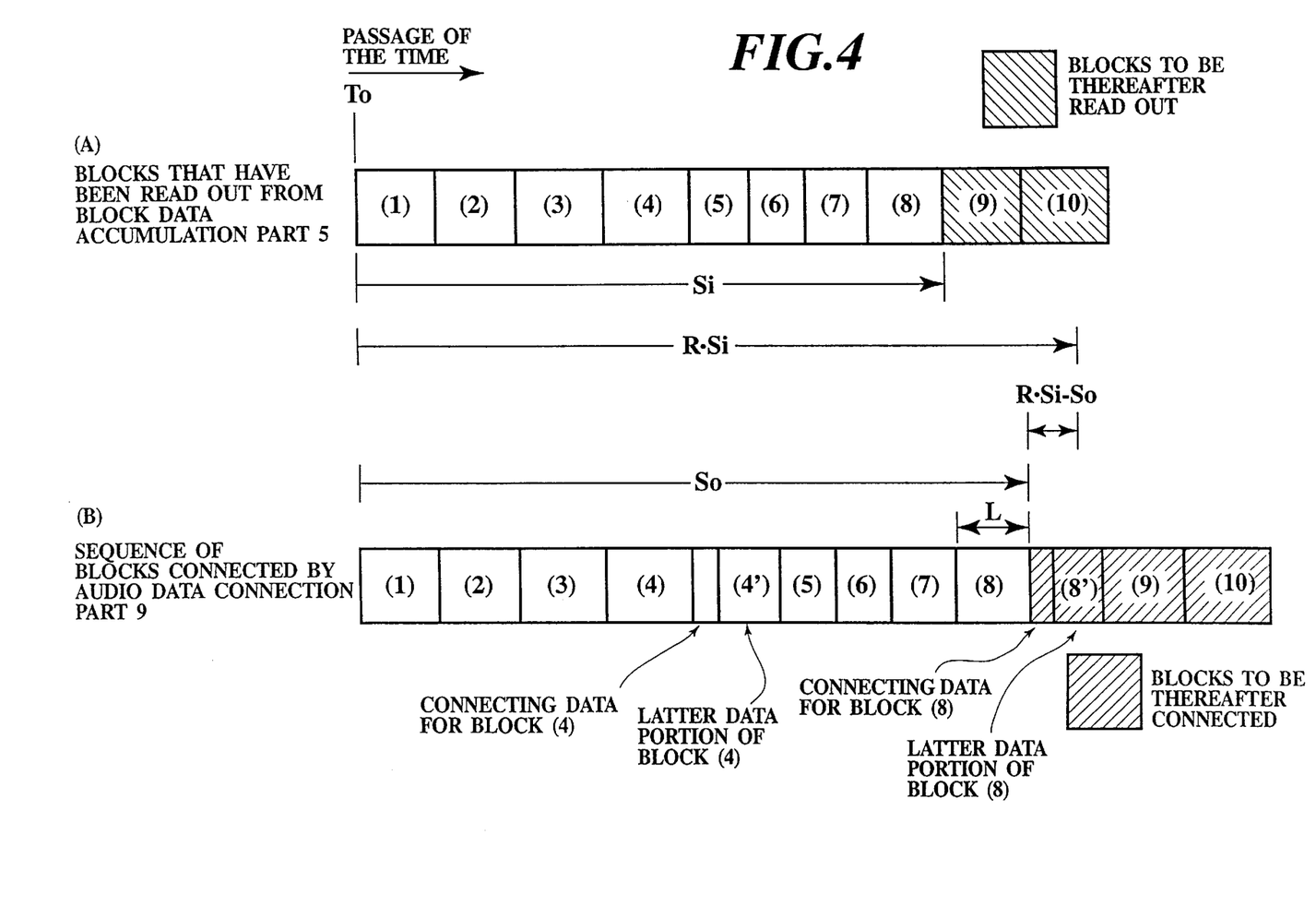
FIG. 4 is a typical view illustrating an example of block connection instructing operation of the connection sequence production part, which is performed when the sound-equipped VTR changeable speed reproduction apparatus illustrated in FIG. 1 has been set as being "slowly"
Figure 5:
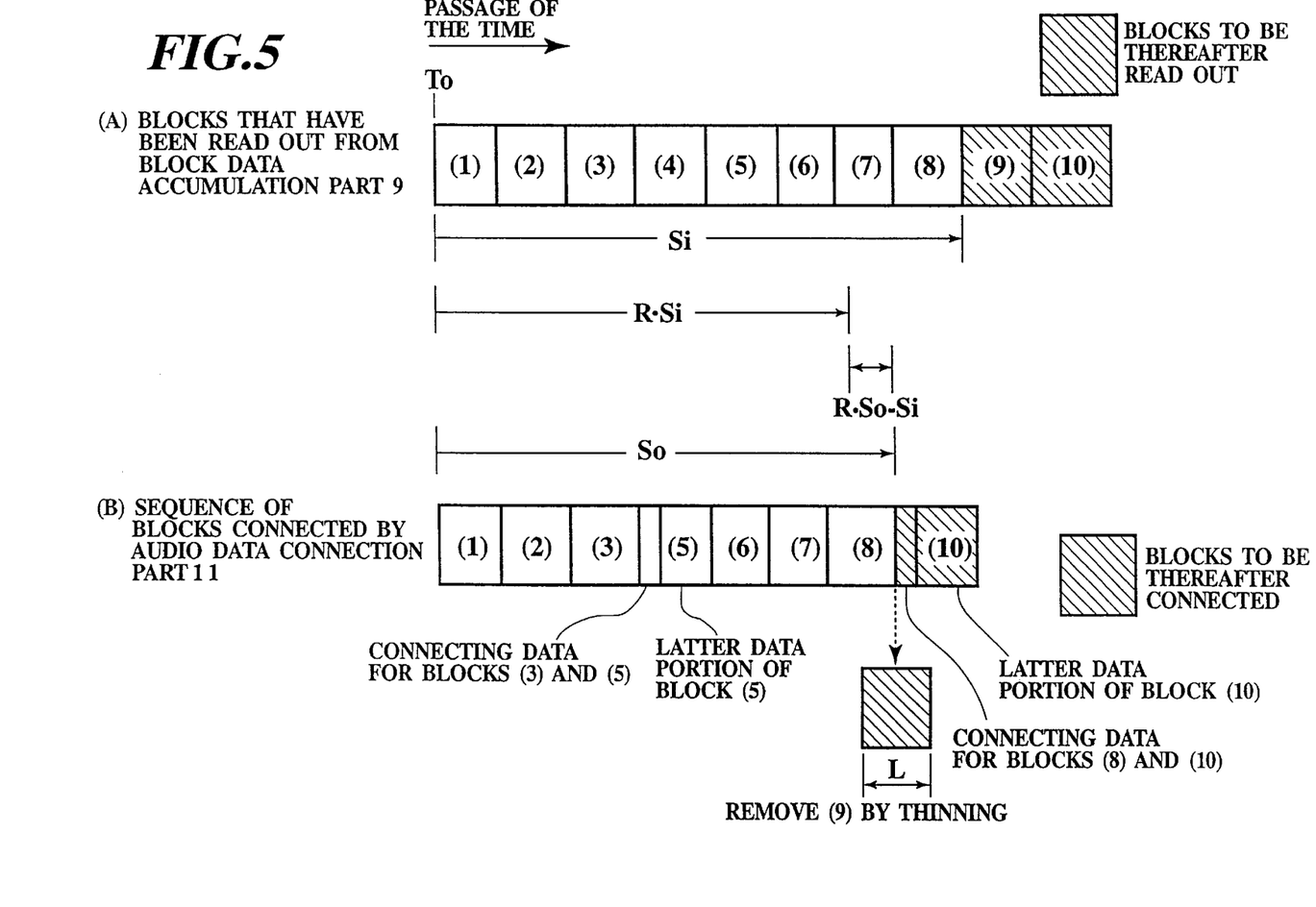
FIG. 5 is a typical view illustrating an example of block connection instructing operation of the connection sequence production part, which is performed when the sound-equipped VTR changeable speed reproduction apparatus illustrated in FIG. 1 has been set as being "quickly".

Further, as the method of producing the connection sequence in the connection sequence determination portion of the connection sequence production part 10, there is used the method illustrated in the typical views of FIGS. 4 and 5.

First, in a case where the sound-equipped VTR changeable speed reproduction apparatus 1 is in operation with the reproduction speed being set as being "slowly", when, in a state where the audio signal that appears while one of the voiced sound section, unvoiced sound section and silent section is being sequentially switched to and replaced by a next one thereof is being input, it has been detected according to the previous connection data output from the audio data connection part 11 that the attribute of the audio data has been replaced by another one or it has been detected that the extension/contraction scale factor of the audio data has been changed as a result of a change in the reproduction speed of the VTR changeable speed reproduction part 2 even when the attribute of the audio data is the same, the connection sequence determination portion determines that the starting conditions for starting the process of producing the connection sequence have been all prepared. And the connection sequence determination portion determines that the time at this point in time is a starting time To as illustrated in (A) in FIG. 4.

Thereafter, the connection sequence determination portion determines a total sum $S_i$ of the input data by adding together all of the block lengths of the audio data that has already been output, using this starting time $T_0$ as a basis, from the block data accumulation part 7 to the audio data connection part 11 and also determines a total sum $S_o$ of the output data by adding together all of the block lengths of the audio data that have already been connected together as illustrated in (B) in FIG. 4. Then, with the timing at which the total input sum $S_i$, total output sum $S_o$, object extension/contraction scale factor R (R=1/r where R≦1.0) and the block length L of the audio data as connected last satisfy the conditions that are shown by the following expression (1), the processing that will be described below is executed.

$$L/2 < R \cdot S_i - S_o \quad (1)$$

Namely, at a position that immediately succeeds the last-connected block, that connecting data corresponding to the last-connected block which is among the connecting data output from the connecting data accumulation part 9 replaces the relevant portion of the block and is inserted instead, and thereafter that portion of the last-connected block which succeeds the portion thereof which has been used to produce the connecting data is repeatedly connected again. And, at a position that immediately succeeds this block data, the remaining blocks are sequentially connected. The connection sequence determination portion thus produces a connection sequence which indicates the above connection procedure and sequence and supplies it to the audio data connection part 11.

As a result of this, in the examples illustrated in (A) and (B) in FIG. 4, the following connection sequence is made at the point in time when the blocks from the first to the eighth block have been sequentially connected together. Namely, since at said point in time the conditions shown by the expression (1) are satisfied, at the position that immediately succeeds the eighth block the connecting data corresponding to this block (the eighth block) replaces the relevant portion of the block and is inserted instead, and thereafter that portion of the eighth block which succeeds the portion thereof which has been used to produce the connecting data is repeatedly connected. It is to be noted that in the example illustrated in FIG. 4 the fourth block is already once connected repeatedly.

Also, in a case where the sound-equipped VTR changeable speed reproduction apparatus 1 is in operation with the reproduction speed being set as being "quickly", the processing that will be described below is executed with the timing at which the conditions shown in the following expression (2) hold true.

$$L/2 < S_o - R \cdot S_i \quad (2)$$

Namely, the block that is to be connected last is removed by thinning and, of the connecting data output from the connecting data accumulation part 9, the one for connecting the block that immediately precedes the thinning-removed block and the block that immediately succeeds the same is connected to the relevant position. Further, of the block that immediately succeeds the thinning-removed block, the portion that succeeds the portion, which has been used to produce this connecting data, is connected to this portion. Thereafter, the remaining blocks are sequentially connected to after this portion. The connection sequence determination portion thus produces a connection sequence that indicates such connection sequence and supplies it to the audio data connection part 11.

As a result of this, in the connection example illustrated in (A) and (B) in FIG. 5, at the point in time when the blocks from the first to the eighth block have been sequentially connected, since the conditions illustrated by the expression (2) are satisfied, the ninth block that is to be connected to immediately after the eighth block is removed by thinning, whereby, of the tenth block, the portion that succeeds the portion, which has been used to produce the connecting data, is connected to the connecting data. It is to be noted that in this example of FIG. 5 the fourth block is already once removed by thinning.

Also, while supplying the connection contents (the previous connecting data) such as those in the already connected audio data to the connection sequence production part 10, the audio data connection part 11 performs timely correction of the extension/contraction scale factor so as to make zero the non-coincidence t output from this part 10. And, while performing such a timely correction, the connection part 11 connects, according to the connection sequence output from the connection sequence production part 10, the audio data in block units output from the block data accumulation part 7 and the connecting data output from the connecting data accumulation part 9. And, while storing temporarily the thus-obtained series of audio data into the buffer ring, the connection part 11 supplies it to the D/A conversion part 12.

The D/A conversion part 12 comprises a memory in which audio data is stored and which outputs it in an FIFO format and a D/A conversion circuit which reads out the audio data from this memory at a prescribed sampling rate and performs D/A conversion of it to thereby produce audio signals. The D/A conversion part 12 takes in a series of the audio data output from the audio data connection part 11 and, while buffering it, performs D/A conversion of it to thereby produce audio signals, and then outputs them.

In this way, according to this embodiment, when having reproduced an audio signal at a speed different from that at the time of recording through the control of the VTR changeable speed reproduction part 2, by, while matching the sampling frequency $f_i$ (Hz) used when performing A/D conversion with the sampling frequency $f_o$ (Hz) used when performing D/A conversion by the use of the sampling frequency conversion part 4, dividing the audio data into blocks each having a prescribed time width and if necessary performing interpolation or thinning thereof according to the changeable speed ratio r of the VTR changeable speed reproduction part 2 and the attribute of the sound, a high quality of sound with no change being made in the pitch thereof is output while synchronizing the presented timing of the sound with a video signal that has been changeable-speed reproduced in the VTR changeable speed reproduction part 2. For this reason, the apparatus 1 can take in the sound that has been changeable speed reproduced and has changed in pitch within a range over which the changeable speed is in practical use as when reproduction has been made at a speed that is ½ time, or 2 times, higher. And, while the clearness of the sound is being maintained as is and in a state where the sound has been synchronized highly accurately with the image, the pitch can be restored to the original level within a range of approximately ±1 octave or so.

Also, according to this embodiment, when performing digital signal processing on the audio data that has been obtained by performing A/D conversion, at the sampling frequency $f_i$, of the audio signal that has been reproduced from a recording medium at the changeable speed ratio r with respect to the normal or regular reproduction speed, the apparatus uses the following procedures. Namely, by performing a series of processes of performing analysis processing on the attribute of the audio signal, dividing the audio data into blocks each having a prescribed time width according to data that has been obtained through the performance of the analysis processing and if necessary performing interpolation or thinning of the data in units of a block to thereby make the time length of the data if necessary 1/r time greater, and, after the performance of such series of processes and the resulting production of the audio data, performing D/A conversion of the output audio data at the sampling frequency $f_o$ (Hz), an audio signal is produced. For this reason, the apparatus can take in the sound that has been changeable speed reproduced and has changed in pitch within a range over which the changeable speed is in practical use as when reproduction has been made at a speed that is ½ time, or 2 times, higher. And, while the clearness of the sound is being maintained as is and in a state where the sound has been synchronized highly accurately with the image, the pitch can be restored, while the connection portions of the sound are being optimized, to the original level within a range of approximately ±1 octave or so.

Further, according to this embodiment, when the changeable speed radio r of the audio signal output from the VTR changeable speed reproduction part 2, the sampling frequency $f_i$ used when performing A/D conversion of this audio signal, the sampling frequency $f_o$ used when performing D/A conversion of the audio data satisfy the relationship of $f_i/f_o=r$, there is used the sampling frequency $f_i=r \cdot f_o$ (Hz). Also, when the sampling frequencies $f_i$ and $f_o$ and the changeable speed ratio r are in the relationship of $f_i/f_o \neq r$, there is used the sampling frequency $f_i$ that is expressed by $f_i=r \cdot f_o/c$ that includes the sampling frequency conversion coefficient c. Using the technique of merely adding a small number of circuits to a conventionally used circuit, which is to insert the sampling frequency conversion part 4 into between the A/D conversion part 3 and the block data division part 6 (the analysis processing part 5), the apparatus takes in the sound that has been changeable speed reproduced and has changed in pitch within a range over which the changeable speed is in practical use as when reproduction has been made at a speed that is ½ time, or 2 times, higher. And, while the clearness of the sound is being maintained as is and in a state where the sound has been synchronized highly accurately with the image by completely correcting the time non-coincidence between the sound and the image, the pitch can be restored, while the connection portions of the sound are being optimized, to the original level within a range of approximately ±1 octave or so.

Further, according to this embodiment, when performing digital signal processing on the audio data that has been obtained by performing A/D conversion, at the sampling frequency $f_i$, of the audio signal that is output from the VTR changeable speed reproduction part 2, the block length in block units that is output from the block data accumulation part 7 is calculated at all times by the input data length monitoring portion 21, which constitutes the connection sequence production part 10, to thereby determine the input data length leng_in. Then, while determining this input data length, the extension/contraction scale factor (inverse multiple) 1/r is calculated by the output data target length calculation portion 22 according to the input data length leng_in and the changeable speed ratio r output from the VTR changeable speed reproduction part 2 to thereby determine the output data target length "target" (target=leng_in/r). Also, in parallel with this, by the output data length monitoring portion 23, an output data length leng_out is determined according to the previous connection data output from the audio data connection part 11. Thereafter, determination is made of the difference t (t=target−leng_out) between the output data target length "target" and the output data length leng_out by the comparison portion 24, whereupon this difference is supplied to the audio data connection part 11. And the extension/contraction scale factor is so adjusted as to zero this difference t. For this reason, the apparatus takes in the sound that has been changeable speed reproduced and has changed in pitch within a range over which the changeable speed is in practical use as when reproduction has been made at a speed that is ½ time, or 2 times, higher. And, while the clearness of the sound is being maintained as is and in a state where the sound has been synchronized highly accurately with the image by completely correcting the time non-coincidence between the sound and the image, the pitch can be restored, while the connection portions of the sound are being optimized, to the original level within a range of approximately ±1 octave or so.

Additionally, although in the above-described embodiment it is arranged that determination is made of the difference t (t=target−leng_out) between the output data target length "target" and the output data length leng out by the connection sequence production part 10, whereupon the extension/contraction scale factor is so adjusted as to zero this difference t in the audio data connection part 11 according to the necessity, it may be also arranged to feed the time data output from the VTR changeable speed reproduction part 2 directly back to the audio data connection part 11 and to control the extension/contraction scale factor so that the timing of the image and the timing of the sound may coincide with each other.

Also, although in the above-described embodiment the sampling frequencies $f_i$ and $f_o$ are determined so that the sampling frequency $f_i$ used in the A/D conversion part 3, the sampling frequency $f_o$ used in the D/A conversion part 12 and the changeable speed ratio r may satisfy the prescribed relationship, the D/A conversion sampling frequency $f_o$ may be fixed at this time to 32 kHz in order to ensure a frequency band width (15 kHz) for ground TV broadcasting or satellite broadcasting in A mode. Similarly, it is preferable to make the D/A conversion sampling frequency $f_o$ have a fixed value, also, for the purpose of making fixed the frequency band width of the output sound and irrespective of the reproduction speed of the VTR changeable speed reproduction apparatus.

Further, since in the above-described embodiment, extension/contraction processing, pitch adjustment processing, etc. are performed with respect to the sound portion only, it may be arranged to constitute a control interface for use in a business use VTR apparatus, which uses a systematic format, and to equip the existing business use VTR apparatus externally with this control interface to thereby perform the above-described pitch restoration processing.

As a result of this, the effect of the above-described embodiment can be obtained with even a VTR apparatus that uses the presently used VTR apparatus recording and reproduction system such as a high-vision system, NTSC system or the like or with even any type of VTR apparatus such as HDD-1000, D5-VTR or the like.

Industrial Utilizabitlity

As has been described above, according to the resent invention, it is possible to take in the sound that has been changeable speed reproduced and has changed in pitch within a range over which the changeable speed is in practical use as when reproduction has been made at a speed that is ½ time, or 2 times, higher. And, while the clearness of the sound is being maintained as is and in a state where the sound has been synchronized highly accurately with the image, it is possible to restore the pitch, while the connection portions of the sound are being optimized, to the original level within a range of approximately ±1 octave or so.

Also, it becomes possible to realize the apparatus with a simple construction of merely adding a small number of circuits to a conventionally used circuit.

What is claimed is:

1. An audio processing method of, when reproducing, at a reproduction speed different from that at which an audio signal have been recorded in a recording medium, the audio signal on the recording medium, adjusting the pitch of the reproduced audio signal, the method comprising the steps of:

performing A/D conversion, at a sampling frequency $f_i$, of the audio signal that has been reproduced from the recording medium;

performing analysis processing on audio data that has been obtained by the A/D conversion according to the attribute thereof;

dividing the audio data into block units each having a prescribed time width according to data that has been obtained by the analysis processing;

performing a series of processings of performing interpolation or thinning processing on the audio data in divided block units if necessary to thereby make data length thereof I/r greater and thereby produce output audio data;

performing D/A conversion, at a sampling frequency $f_o$, of the thus-produced output audio data to thereby output a sound synchronized with an image; and setting the respective sampling D/A conversion of the audio data to thereby produce an audio signal, and the changeable speed ratio r may satisfy prescribed conditions.

2. An audio processing method according to claim 1, wherein as the prescribed conditions, when the sampling frequencies $f_i$ and $f_o$ and the changeable speed radio r satisfy the relationship of $f_i/f_o=r$, there is used the sampling frequency $f_i$ which is represented by an expression $f_i=r \cdot f_o$; and when the sampling frequencies $f_i$ and $f_o$ and the changeable speed ratio r are in the relationship of $f_i/f_o \neq r$, there is used the sampling frequency $f_i$ that is represented by an expression $f_i=r \cdot f_o/c$ that includes a sampling frequency conversion coefficient c.

3. An audio processing method according to claim 2, when performing digital signal processing on the audio data that has been obtained by performing A/D conversion, at the sampling frequency $f_i$, of the audio signal that has been reproduced from the recording medium at the changeable speed ratio r, the digital signal processing comprising the steps of:

monitoring time data of the audio signal read out from the recording medium and time data of the output audio data that has been obtained through the performance of the series of processes to thereby correct time non-coincidence that occurs between the audio signal and the output audio data.

4. An audio processing apparatus for, when reproducing, at a reproduction speed different from that at which an audio signal has been recorded in a recording medium, the audio signal on the recording medium, adjusting the pitch of the reproduced audio signal, the audio processing apparatus comprising:

A/D conversion means (3) for performing A/D conversion, at a sampling frequency $f_1$, of the audio signal that has been reproduced from the recording medium;

analysis processing means (5) for performing analysis processing on audio data that has been obtained by the A/D conversion according to the attribute thereof;

block data division means (6) for dividing the audio data into block units each having a prescribed time width according to data that has been obtained by the analysis processing;

output audio data production means (11) for performing a series of processings of performing interpolation or thinning processing on the audio data in divided block units if necessary to thereby make data length thereof 1/r greater and thereby produce output audio data;

audio output means (12) for performing D/A conversion, at a sampling frequency $f_o$, of the thus-produced output audio data to thereby output a sound synchronized with an image; and sampling frequency setting means for setting the respective sampling frequencies $f_i$ and $f_o$ so that the sampling frequency $f_i$ used when performing A/D conversion, the sampling frequency $f_o$ used when performing D/A conversion of the audio data to thereby produce an audio signal, and the changeable speed radio r may satisfy prescribed conditions.

5. An audio processing apparatus according to claim 4, wherein as the prescribed conditions that are set by the sampling frequency setting means, when the sampling frequencies $f_i$ and $f_o$ and the changeable speed radio r satisfy the relationship of $f_i/f_o=r$, there is used the sampling frequency $f_i$ which is represented by an expression $f_i=r \neq f_o$; and when the sampling frequencies $f_i$ and $f_o$ and the changeable speed ratio r are in the relationship of $f_i/f_o \neq r$, there is used the sampling frequency $f_i$ that is represented by an expression $f_i=r \cdot f_o/c$ that includes a sampling frequency conversion coefficient c.

6. An audio processing apparatus according to claim 5, wherein the output audio data production means (11) comprises means for monitoring time data of the audio signal read out from the recording medium and time data of the output audio data that has been obtained through the performance of the series of processes to thereby correct time non-coincidence that occurs between the audio signal and the output audio data.

7. A recording and reproduction apparatus comprising the audio processing apparatus according to claim 6.

8. A recording and reproduction apparatus comprising the audio processing apparatus according to claim 5.

9. A recording and reproduction apparatus comprising the audio processing apparatus according to claim 4.

* * * * *

UNITED STATES PATENT AND TRADEMARK OFFICE
CERTIFICATE OF CORRECTION

PATENT NO.    : 6,360,198 B1
DATED         : March 19, 2002
INVENTOR(S)   : Atsushi Imai et al.

It is certified that error appears in the above-identified patent and that said Letters Patent is hereby corrected as shown below:

Column 4,
Line 17, change "$f_1$" to -- $f_i$ --.

Column 5,
Line 23, delete "." following -- high --.

Column 10,
Line 36, change "hereupon" to -- whereupon --.
Line 60, change "To" to -- $T_0$ --.

Column 14,
Line 17, insert "__" before -- leng --.
Line 56, change "Utilizabitlity" to -- Utilizability --.
Line 57, change "resent" to -- present --.

Column 16,
Line 2, change "$f_1$" to -- $f_i$ --.
Line 38, change "$f_1 = r = f_0$ to -- $f_1 = r \bullet f_0$ --.

Signed and Sealed this

Third Day of September, 2002

Attest:

Attesting Officer

JAMES E. ROGAN
Director of the United States Patent and Trademark Office